United States Patent
Nee et al.

(10) Patent No.: US 6,876,857 B1
(45) Date of Patent: Apr. 5, 2005

(54) SYSTEM AND METHOD FOR PERFORMING ADMISSION CONTROL FUNCTIONS IN A DATA NETWORK

(75) Inventors: Cheng-Lee Nee, San Jose, CA (US); Qingming Ma, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 612 days.

(21) Appl. No.: 09/910,632

(22) Filed: Jul. 20, 2001

(51) Int. Cl.[7] .................................................. H04Q 7/20
(52) U.S. Cl. ................ 455/450; 455/452.1; 455/452.2; 455/453; 455/442; 455/436
(58) Field of Search ............................. 455/450, 452.1, 455/452.2, 453, 442, 436, 454

(56) References Cited

U.S. PATENT DOCUMENTS

| | | | |
|---|---|---|---|
| 5,583,857 A | 12/1996 | Soumiya et al. ............ 370/233 |
| 5,625,877 A | 4/1997 | Dunn et al. ................ 455/34.1 |
| 5,787,080 A | 7/1998 | Hulyalkar et al. .......... 370/348 |
| 5,982,760 A | 11/1999 | Chen ........................... 370/335 |
| 6,069,883 A | 5/2000 | Ejzak et al. ................ 370/335 |
| 6,084,866 A | * 7/2000 | Dorenbosch et al. ....... 370/331 |
| 6,097,733 A | 8/2000 | Basu et al. .................. 370/468 |
| 6,125,278 A | * 9/2000 | Wieczorek et al. ......... 455/437 |
| 6,188,905 B1 | * 2/2001 | Rudrapatna et al. ...... 455/452.2 |
| 6,385,454 B1 | * 5/2002 | Bahl et al. ................... 455/450 |
| 6,418,148 B1 | * 7/2002 | Kumar et al. ............... 370/468 |
| 6,459,681 B1 | 10/2002 | Oliva ........................... 370/232 |
| 6,466,544 B1 | 10/2002 | Sen et al. ..................... 370/231 |
| 6,504,820 B1 | 1/2003 | Oliva ........................... 370/232 |
| 6,516,196 B1 | 2/2003 | Chen et al. ................... 455/450 |
| 6,529,734 B1 | * 3/2003 | Lagneborg et al. ....... 455/452.2 |
| 6,571,102 B1 | 5/2003 | Hogberg et al. ............. 455/450 |
| 6,594,245 B1 | * 7/2003 | Rimhagen et al. .......... 370/337 |
| 6,608,815 B1 | 8/2003 | Huang et al. ................ 370/232 |
| 6,643,515 B2 | 11/2003 | Macridis et al. ............. 455/450 |
| 6,721,568 B1 | * 4/2004 | Gustavsson et al. ......... 455/450 |
| 2002/0142777 A1 | * 10/2002 | McGovern et al. .......... 455/450 |
| 2003/0125030 A1 | * 7/2003 | Dixon .......................... 455/447 |

* cited by examiner

*Primary Examiner*—Sonny Trinh
*Assistant Examiner*—Huy Phan
(74) *Attorney, Agent, or Firm*—Baker Botts L.L.P.

(57) ABSTRACT

A resource manager 20 receives and compiles data from a plurality of base transceiver station 14 to enable an admission control decision before beginning a communication session with a mobile unit 12. The historic usage patterns of the mobile unit 12 and the historic and present bandwidth availability for cells likely to be impacted are taken into account to make the admission control decision.

15 Claims, 3 Drawing Sheets

| | 4:30 | 4:40 | 4:50 | 5:00 | 5:10 | 5:20 |
|---|---|---|---|---|---|---|
| INT 1 | 20 | 25 | 30 | 90 | 95 | 110 |
| INT 2 | 10 | 5 | 35 | 110 | 120 | 105 |
| DIFF 1 | 5 | 10 | 20 | 100 | 90 | 80 |
| DIFF 2 | 5 | 5 | 5 | 20 | 10 | 40 |

CELL A

| MSID | 1 CELL CALL(cc) | 2cc | 3cc | 4cc | 5cc | 6cc | 7cc | 8cc | 9cc | 10cc |
|---|---|---|---|---|---|---|---|---|---|---|
| 011 | 30 | 25 | 30 | 5 | 10 | 2 | 4 | 0 | 2 | 1 |
| | 100 | 70 | 45 | 25 | 20 | 10 | 8 | 4 | 4 | 2 |

| | MSID | | | | | | | | | |
|---|---|---|---|---|---|---|---|---|---|---|
| 011 RANK NUMBER | 1 | 2 | 3 | 4 | 5 | 6 | 7 | 8 | 9 | 10 |
| CELL | B | A | D | C | G | F | I | E | H | J |
| % | 35 | 30 | 15 | 7 | 4 | 3 | 2 | 1 | 1 | 1 |

SYSTEM AND METHOD FOR PERFORMING ADMISSION CONTROL FUNCTIONS IN A DATA NETWORK

TECHNICAL FIELD OF THE INVENTION

This invention relates in general to the field of electronic systems and more particularly to an improved system and method for performing the admission control function in a data network.

BACKGROUND OF THE INVENTION

The incorporation of mobile users into data networks has created various challenges to the management of those networks. For example, as a mobile user moves from one portion of the network to another, the user may move from a cell within the network which is able to provide the user with the necessary bandwidth for the session in which the user is engaged to a cell which is already overloaded with data traffic. This unfortunate circumstance may result in the loss of data or the unwanted termination of a data communications session.

Most existing mobile communication networks are circuit switched networks where each interaction with the user is dedicated a circuit. Each circuit has a defined data transfer rate. For example, a typical circuit might have the capability to transfer data at 64 kilobits per seconds. In a circuit switched environment, when a user requests service from a particular cell of the network, the cell merely has to determine whether or not a circuit is available. Circuit switched environments are very inefficient in this context, however, because the dedication of a full circuit to a data session may not utilize the full bandwidth of the circuit. In addition, other services may require more data transfer capability and more bandwidth than a single circuit can provide.

Modern wireless data networks include different quality of service levels within the same data network. Using these quality of service levels, a user can contract with a provider to insure an appropriate level of bandwidth and priority availability of bandwidth. The data networks must be able to differentiate between the various quality of service levels and the data communications sessions which are occurring within each service level. The ability to parse the total bandwidth into varying service levels and varying bandwidth allocations greatly enhances the services that can be offered by a data communications network but greatly complicates the decision as to whether or not a new user to a cell is allowed to begin a session. In the past, data networks have attempted to address this problem by allocating fixed percentages of the total bandwidth to various service levels offered. Once again, however, this is a highly inefficient allocation of bandwidth and can result in users of the network being rejected even though sufficient bandwidth is available to provide the session.

SUMMARY OF THE INVENTION

Accordingly, a need has arisen for an admission control system and method which efficiently allocates bandwidth available within the network but which does not emit a new user to the network if components of the network are not able to continue the session requested due to bandwidth constraints.

In accordance with the teachings of the present invention, an admission control system and method are provided that substantially eliminate or reduce problems associated with prior techniques.

In accordance with one embodiment of the present invention, a method of processing a request for a data communications session is provided that includes the steps of identifying the user requesting the data transfer session and retrieving historic data associated with the user. The method also includes the step of retrieving current bandwidth usage data associated with the cell in which the user resides and with a predetermined number of cells contiguous to the current cell. The method also includes the step of determining in a weighted fashion whether the current cell and selected contiguous cells have sufficient bandwidth to service the data transfer session requested by the user and admitting or rejecting the user based on such determination.

An important technical advantage of the present invention inheres in the fact that the system and method for admission control of the present invention provide for a determination of whether or not both the current cell in which the user resides and cells in which the user may travel have sufficient bandwidth resources to support the data transfer session requested by the user. In this manner, it is much less likely that the user will begin a session and then have the session dropped during the handoff to a new cell. This is due to the fact that the admission control system of the present invention uses historical data and current load data to determine whether or not, in a probabilistic fashion, cells which may be visited by the user during the session have sufficient bandwidth to support the session.

An additional technical advantage of the present invention inheres in the fact that various quality of service levels and service offerings need not be dedicated portions of the bandwidth of a data communications system. Because of the sophistication of the methods used in the present invention, the data service offerings may be given wide ranges of the percentage of total bandwidth available so that the total bandwidth will be used more efficiently and new sessions will not be rejected when sufficient bandwidth is available.

BRIEF DESCRIPTION OF THE DRAWINGS

A more complete understanding of the present invention may be acquired by referring to the accompanying figures in which like reference numbers indicate like features and wherein.

DETAILED DESCRIPTION OF THE DRAWINGS

Figures 1, 2A, 2B:
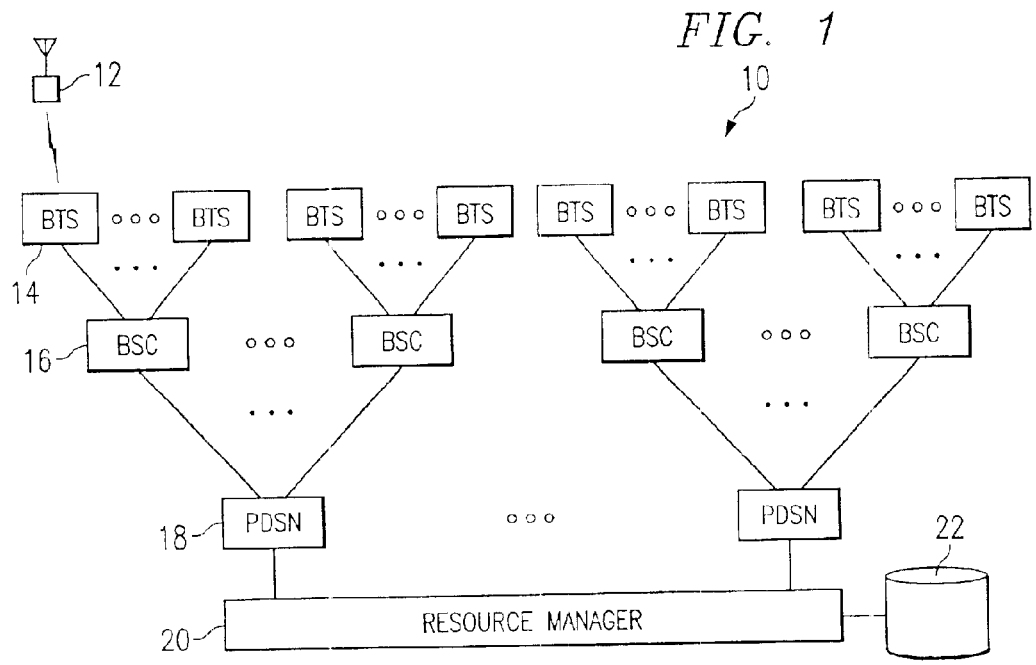
FIG. 1 is a block diagram of a data communication system constructed according to the teachings of the present invention.
FIGS. 2A, 2B and 2C illustrate portions of tables characterizing bandwidth load and user activity information which may be used in the system and method of the present invention.

FIG. 1 is a block diagram of a data communications system, indicated generally at 10, which provides communications services to the user of a mobile device 12 which is illustrated in FIG. 1 to be communicating with a base transceiver station (BTS) 14. Mobile device 12 may comprise any suitable mobile voice or data communications device such as a cellular telephone, a digital cellular telephone, a personal digital assistant or personal computer which incorporate wireless communication facilities or other devices which are capable of wireless communication with BTS 14. The communications system 10 is capable of providing both conventional cellular voice services to the device 12 as well as more sophisticated packet data services.

As will be discussed herein, the user of device 12 is associated by system 10 with various historical usage information. In addition, the system 10 is capable of supplying various levels of service to users such as the user of device 12. In general, a user of a mobile device is resident within a particular cell of the system that is managed by a particular BTS such as BTS 14. The user of the device will request a communications session by communicating wirelessly with a local BTS such as BTS 14. The system 10 will identify the user and the level of service requested and must make a determination as to whether or not the system 10 has the capacity to supply the services requested. This is a complex determination based on the service requested and the current and historical usage of the bandwidth available at various places within the system at any particular time. The decision as to whether or not the user will be allowed to begin the session is referred to as the admission control decision. The admission control decision is complicated by the fact that the most limited resource within system 10 is the air wave interface between the BTS and the mobile device. As such, as the user of mobile device 12 moves from one cell to another under the purview of different BTS', the user is utilizing bandwidth in various parts of the system 10. Before admitting the user, it is advantageous if the system 10 can determine whether or not the user is likely to encounter a particular cell that is unable to service the requested session. If this determination can be made, the user can be refused the session at the outset which is much less inconvenient for the user than beginning the session and then having it terminated in the middle of the session when the ongoing session is transferred to a full cell.

Referring again to FIG. 1, BTS 14 communicates with and is served by a base station controller 16. A plurality of base transceiver stations such as BTS 14 are served by BSC 16. Likewise, BSC 16 is connected to and is served by a packet data servicing node (PDSN) 18. Similarly, a plurality of base station controllers such as BSC 16 are served by PDSN 18 as shown in FIG. 1. PDSN 18 is connected to and is served by a resource manager 20. Resource manager 20 serves any number of packet data servicing nodes such as PDSN 18 as shown in FIG. 1. Accordingly, system 10 is organized in a tree structure where resource manager 20 serves as a shared resource for a large number of base transceiver stations such as BTS 14. Resource manager 20 is able to receive through the BSC 16 and PDSN 18 usage information and current load information from a number of base transceiver stations including BTS 14.

The current usage information, historical usage information and user activity information that will be described herein are stored by resource manager on storage system 22 shown in FIG. 1. Resource manager 20 comprises a suitable computing platform such as a micro or mini computer which is capable of storing, retrieving and processing information stored in storage system 22. Storage system 22 comprises any suitable configuration of memory devices of short term and long term memory devices such as disk drives, optical or magnetic storage systems or static or dynamic memory systems. The resource manager 20 communicates with the other components shown in FIG. 1 through the conventional receipt, transmission, and routing of data packets which may be organized and routed using various suitable protocols such as the TCP/IP protocol.

As discussed previously, modern data packet services can be offered with various quality of service levels. In general, the services can be divided into three categories. The first category is a "best efforts" category. In general, the best efforts category of data service comprises a service which must always be available at the agreed upon data rate. As will be discussed herein, the system 10 must make special accommodation to always reserve sufficient bandwidth for the best efforts category of service. The second category of service is referred to as an integrated service. An integrated service is similar to a best efforts service in that the network must provide the service if it is requested. However, the integrated service, as will be discussed herein, can be included in the probabilistic determinations of the future needed bandwidth within a particular cell. Finally, the last class of service is referred to as a differentiated service. Differentiated services are lower priority than both integrated and best efforts services and are treated differently in the calculation of available bandwidth as will be discussed herein. According to the teachings of the present inventions, the resource manager 20 compiles historic bandwidth usage information over time for each cell within the system 10 and uses this historic usage information to make admission control decisions.

FIG. 2A is a table which may be used by one embodiment of the system of the present invention. The table in FIG. 2A illustrates historic average usage information for a particular cell, cell A, within system 10. The table in 2A is two dimensions with one dimension being a time of day axis and the other dimension being a service identification. The data within table 2A is expressed as a data rate which may be expressed in units such as kilobits per second. For example, referring to FIG. 2A, a particular differentiated services "diff 1" utilizes 20 kilobits per second on average at 4:50p.m. This same service utilizes on average 100 kilobits per second at 5:00p.m. In this manner, the historic usage of a particular service within a particular cell at a particular time of day can be stored by resource manager in storage system 22. Each data entry within the table as shown in FIG. 2A can be compiled using various averaging techniques. For example, exponential averaging which gives greater weight to the most recent information may be used if the usage within a particular cell is changing dramatically over time.

In addition, additional axes could be incorporated into the table shown in FIG. 2A to increase the accuracy of the information. For example, the data shown in FIG. 2A could be accumulated for each day of the week so that the table shown in FIG. 2A might be the appropriate information for every Tuesday and additional tables could be stored for the remaining days of the week. In this manner, the differences between the data traffic associated with a particular service on a weekend day and a weekday could be reflected in the admission control techniques implemented by system 10.

The resource manager 20 also stores historic usage information associated with users of the system 10 such as the user associated with mobile device 12. FIG. 2B illustrates a table which includes part of this information. Each mobile device such as mobile device 12 is associated with a mobile system identifier or MSID. The table shown in FIG. 2B illustrates historic data for a particular user such as the user associated with device 12. Referring to FIG. 2B, the mobile system identified by MSID 011 over a predetermined period of time engaged in communication sessions 30% of the time which were within a single cell. Looking at another portion of FIG. 2B, the same device engaged in sessions which impacted exactly 5 cells 10% of the time. The information shown in FIG. 2B includes information up to a session which involves 10 separate cells. The table shown is solely for purposes of teaching the present invention and smaller or larger tables could be included to accommodate greater accuracy or reduce the amount of processing time as will be described herein. The information shown in FIG. 2B characterizes the historic activity of the user associated with the device identified by MSID 011. This information can be used to predict the probability that this particular user will impact a given number of contiguous cells for a particular session. Although it will be described more complete with reference to FIG. 3 herein, in general, the user associated with the information in FIG. 2B has a 30% chance that the user will not leave the cell in which he starts the call. Further, by adding the first two columns it can be predicted that there is a 55% chance that the session associated with this user will only impact a current cell and a single other cell contiguous to the current cell. In this manner, the probabilities of the impact on contiguous cells further and further away from the current cell can be predicted based on the historic usage patterns of the particular user.

Referring again to FIG. 2B a second set of percentages may be stored for each mobile device. The second line in FIG. 2B indicates the percentage of calls which will affect a given number of cells. In the example given in FIG. 2B, forty-five percent of the calls historically for the mobile device associated with MSID011 have affected three cells during the call. Similarly four percent of the calls of this mobile device have affected 8 cells during the call. This percentage is different than the percentage expressed in the first line of FIG. 2B because when added together the first line if all possible cells were included would, added together, equal 100%. The second line does not have this characteristic. All cell calls will affect one cell therefore 100% of the calls affect one cell. Seventy percent of the calls affect two cells but only 25% of the calls are 2 cell calls only. This is due to the fact that calls that affect more than two cells also affect two cells. The tables are related in the sense that the percentages expressed in the second data set in each column are the difference between 100% and the numbers to the left of the given column in the first data set. For example, the percentage of calls that affects three cells is 45% which is 100% minus the percentage of one cell and two cell calls which added together equals 55%.

Figures 2C, 3:
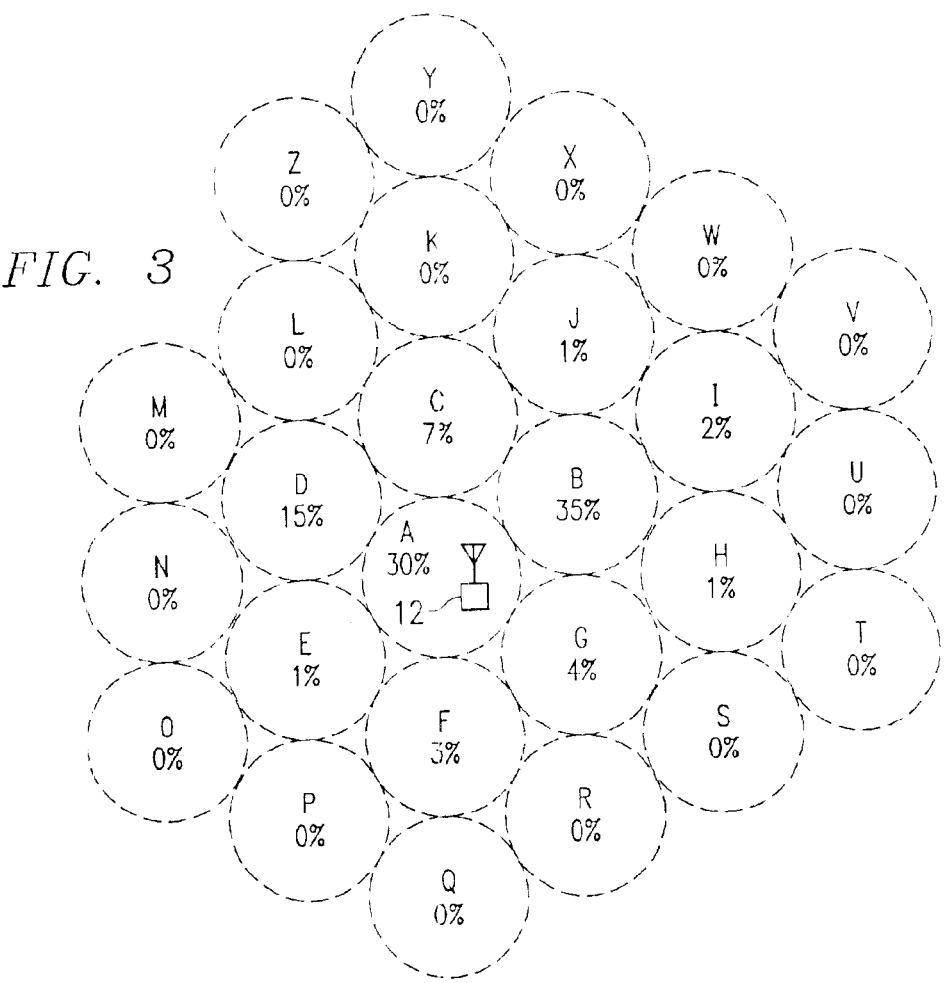
FIG. 3 is a diagram which illustrates a set of contiguous cells serviced by a system constructed according to the teachings of the present invention.

FIG. 2C is a table which illustrates further information which is stored by the resource manager 20 associated with each user. In FIG. 2C, the same MSID 011 is associated with a given number of cells. The cells are indicated in FIG. 2C with the letters A–J. Cells A–J are ranked in order by the percentage of time the user associated with MSID 011 is resident in those cells and such percentage is stored for each associated cell. For example, the user is resident within cell B 35% of the time, cell A 30% of the time, and cell F 3% of the time. The information in the table in FIG. 2C can once again be used to assess a probability that the user associated with MSID 011 will travel into a particular cell. Once again, the table in FIG. 2C is shown to rank 10 cells but a larger or fewer number of cells could be reflected by the table without departing from the spirit and scope of the present invention.

FIG. 3 is a diagram which illustrates a set of contiguous cells that are managed by system 10. The cells in FIG. 3 have been labeled with the numbers A–Z. For the convenience of the reader, the cells that were reflected in the tables in FIG. 2A–2C have been labeled with the percentages reflected in FIG. 2C. For example, device 12 which, for purposes of teaching the present invention will be associated with MSID 011, is resident in the cell B 35% of the time, in cell J 1% of the time, and in cell A 30% of the time. For purposes of teaching the present invention, we will, assume that cell A is managed by BTS 14 and mobile device 12 is attempting to begin a session within cell A but may travel to any number of contiguous cells surrounding cell A while the session is still active. As such, resource manager 20 must utilize the historic and current bandwidth usage information and the information associated with the user of device 12 to decide whether or not to allow device 12 to begin the session. If the bandwidth controlled by resource manager 20 in cell A and the surrounding cells is so scarce that it is not likely that the session will be able to continue, the resource manager 20 will decide to reject the session. This is a more convenient result for the user of device. 12 than to have the session begin and then have it dropped as the user changes from cell A to another cell which does not have sufficient bandwidth to continue the session.

In order to enable the admission control decision, on a periodic but continuous basis, a bandwidth usage figure will be calculated for each cell. This bandwidth usage figure will be for each service offered by that cell. The current bandwidth figure is calculated using the following equation:

$$CB = HW \times HB + (1 - HW) \times PCB$$

where CB is the current bandwidth; HW is a historic weight which is a fraction between 0 and 1; HB is the historic bandwidth number which reflects the historic usage of that service and is taken from historic usage tables such, as the table discussed with reference to FIG. 2A previously; and the PCB is the previous current bandwidth which is the immediately preceding value of CB calculated using the prior equation. The historic weighting number can be used to adjust the importance of the historic data versus the current usage data. For example, if the historic weight factor is 0.1, then the actual usage information will be 9 times more important to the calculated bandwidth than the historic bandwidth being used.

In order to account for time of day and transit time differences, each cell may also calculate future bandwidth usage by performing the identical calculation but substituting in the values of the historic bandwidth usage for the succeeding time slots illustrated in FIG. 2A. Accordingly, a cell will have a current bandwidth usage number which reflects both actual present usage and historic usage at that time. That cell will also have bandwidth usage numbers for succeeding time intervals which may be used to predict the availability of bandwidth for communication sessions which may arrive at that cell at later succeeding times.

Each cell may also calculate a handoff variable which is given in units of, for example, kilobits per second, and may be a positive or negative number. The handoff variable is calculated by subtracting the amount of new bandwidth which is reserved in a cell from the amount of bandwidth which is released by the cell as a result of sessions leaving the cell over any given period of time. For example, a cell may keep a running handoff variable which keeps track of the net change in bandwidth for the cell over a period of time such as a half hour or hour. As will be discussed later, the handoff variable can be used to adjust a capacity calculation of the cell on a predictive basis to account for additional sessions being added to the cell or released by the cell during the pendency of a session in the cell. In addition to the historic and current usage of bandwidth, various bandwidth allocation policies may also affect the admission control decision. For example, the system 20 may allocate a small percentage of bandwidth for each cell to best efforts traffic. For example, 5–10% of the bandwidth of each cell may be reserved explicitly for best efforts traffic and only the remaining bandwidth may be allocated on a probabilistic basis.

In addition, a policy may be implemented where each class of service is given an upward bound on the percentage of the total remaining bandwidth which may be reserved by that service class. In this manner, even if the bandwidth was available a particular service class could not reserve the entirety of the bandwidth which would result in all other services being excluded. For example, each service such as diff 1, diff 2 or int 1 or int 2, shown in FIG. 2A could be restricted to no more than 60% or 70% of the total bandwidth remaining after the best efforts allocation is reserved.

In addition, the system 10 may treat integrated services and differentiated services differently in terms of their current usage information. For example, integrated services may be incorporated into the current usage profile based on the amount of bandwidth which is reserved for the integrated service as opposed to the amount of bandwidth which is actually being used by a particular session. In this manner, an integrated service may be dedicated the full amount of the bandwidth associated with that service even if the session is not using the full amount at any particular time. In contrast, differentiated services may be included in the current usage profile based on the actual data transfer rate of the sessions associated with those services. If these policies are implemented, the current measured load on a particular cell will be the sum of the reserved bandwidth for integrated services and the used bandwidth for differentiated services.

Using these principles, the presently available bandwidth capacity for a particular cell is given by the equation $$C-(C \times BE\%)-\text{measured load}+\text{handoff variable}$$

where, "C" is the total bandwidth capacity available to the cell; BE% is the percentage of that capacity which is reserved for best efforts traffic; "measured load" is, as described previously, the combination of reserved bandwidth for integrated services and actually used bandwidth for differentiated services; and the "handoff variable" is a positive or negative number of kilobits per second which reflects the change in bandwidth over a predetermined past amount of time.

The resource manager 20 may calculate the available capacity using the previously described equation for each cell under its management. Alternatively, these calculations can be performed at the BTS, BSC or PDSN levels and the final capacity numbers can be communicated to the resource manager 20 on a periodic basis, for example, every three or four minutes. In either case, the resource manager will have a current capacity measure for each cell contiguous to the cell associated with the mobile device requesting service. As discussed previously, the resource manager 20 may also have "future" capacity levels for each relevant cell which are calculated using historic usage information for successive time periods in the historic usage table. This information allows for more accurate predictive decision making for cells that are some distance from an initial cell associated with a session requesting admission. Using this information, the resource manager 20 can make an admission control decision using the techniques which will be described and associated with FIGS. 4A and 4B herein.

Figure 4A:
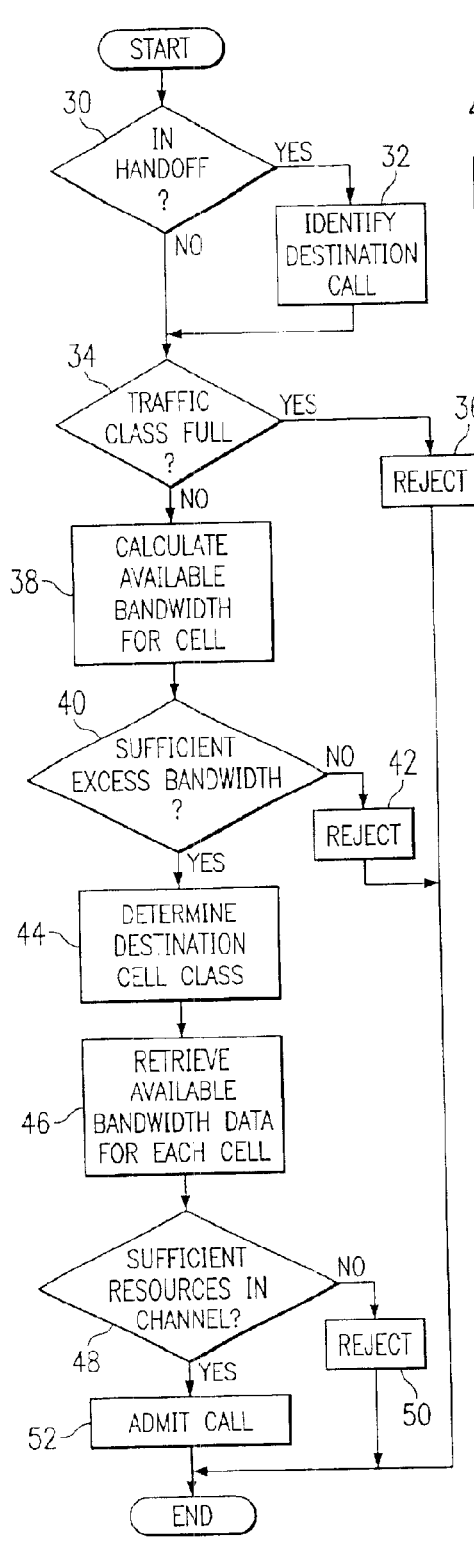
FIGS. 4A and 4B are flow diagrams which illustrate one embodiment of the admission control method of the present invention.

Referring to FIG. 4A, the method begins at step 30 where a determination is made by the resource manager 20 as to whether or not the mobile device requesting the session is in the middle of a handoff to another cell. If the device is in the middle of a handoff from one cell to another, the method proceeds to step 32 where the destination cell of the handoff is identified. If the mobile device is not in the middle of handoff but is in a stable communication with a single cell, the method proceeds directly to step 34. If the method proceeds to step 32, the destination cell is used as the initial cell of the session to determine admission for the session.

At step 34, a determination is made by the resource manager 20 as to whether or not the requested traffic class for the session within the initial cell is over the upward bound for that traffic class. For example, if device 12 is requesting a diff 1 service from cell A and the upward bound is set at 60% and the requested diff 1 service will cause cell A to allocate more than 60% of the total capacity to diff 1 services, the method will proceed from step 34 to step 36 where the session will be rejected, and the method terminates.

If the requested traffic class for the initial cell is not full, the method proceeds to step 38 where the resource manager 20 makes a determination as to whether or not there is sufficient additional bandwidth to support the session in the initial cell without regard to the particular type of service being offered. For example, it may be true that there are not too many diff 1 sessions in place but there is not enough capacity to support the new diff 1 session being requested. In step 38 the resource manager 20 calculates the available bandwidth using the previously discussed capacity equation and the current measured load associated with the initial cell. It should be noted that the actual bandwidth being used is a part of this equation but is not the only factor considered. For example, as discussed previously, the historic usage information is included in the calculation of the measured load and is weighted against the actual measured load. In addition, the handoff variable may add to the available bandwidth if more sessions have been terminated within a predetermined period of time than have been begun.

After the calculation, the method proceeds to step 40 where the method is routed to step 42 if there is not sufficient bandwidth and the session is rejected. If there is sufficient bandwidth, the method proceeds to step 44 where a determination is made as to the destination cells that will be checked for bandwidth capacity.

According to one embodiment of the present invention, a subset of the contiguous cells surrounding cell A are chosen using a combination of the historic usage profile for the user and a randomly generated number. According to this embodiment, a random fraction is generated between 0 and 1. The first line of data stored in the table discussed with reference to FIG. 2B is then used to determine how many contiguous cell intersections should be included in the subset. This is determined by adding the percentages shown in the table when expressed as a fraction together until the random fraction is exceeded. For example, assume the random fraction generated is 0.60. In this case, the random fraction would reside between two cell calls and three cell calls because the percentage associated with two cell calls is 55% and the percentage associated with three cell calls is 75%. The two cell call percentages is calculated by adding the percentages associated with one cell calls and two cell calls. The percentage associated with three cell calls is added by adding the percentages associated with one cell calls, two cell calls and three cell calls. The random component of the calculation is included to restrict the number of cells that need to be checked in order to expedite the admission control decision. If the random number component is truly random, on average, the admission control decision will be accurate because enough cells will be checked during the universe of admission control decisions. Because the random percentage indicated a two cell check for this particular example, the system resource managing system 20 would check the capacity for the initial cell A and any cell which was contiguous to it. In this case, the resource manager 20 would check the initial cell A and cells B, C, D, E, F and G. The resource manager 20 in this example would not check cells which require three cells to be involved in the call. As such, cells such as J, K, L, M, N, etc. would not be checked for this admission control decision. If the random fraction had been greater to include the three cell call, cells such as J, K and L would be included in the admission control decision.

Using the present example, the determination made in step 44 includes cells A, B, C, D, E, F and G. The method then proceeds to step 46, where the available bandwidth data is retrieved for each of the cells within the subset to be checked. The method then proceeds to step 48 where the bandwidth required for the requested session is compared to the available capacity in each of those cells. If there is not sufficient bandwidth, the method proceeds to step 50 where the session is rejected. If there is sufficient bandwidth in each of the subset of cells checked, the method proceeds to step 52 where the session is admitted. The method then terminates.

According to one embodiment of the present invention, the time of day information shown in FIG. 2A is used to more accurately predict the available bandwidth in contiguous cells. According to this embodiment, the current bandwidth information is used for the initial cell and the historic usage data associated with subsequent times of day are used for contiguous cells. As an example, if the current time is 4:50p.m., the capacity calculation for cell A, the initial cell, uses the historic data associated with the requested service in table A under 4:50p.m. This historic data is combined using a historic weight as described previously with the current bandwidth information associated with the initial cell A. In contrast, the contiguous cells such as cell B may use the current bandwidth information and combine that with historic data for a subsequent time interval. In this example, the calculation for cell B would not use the bandwidth percentage for 4:50p.m. but might use the bandwidth percentage for 5:00p.m. This more accurately predicts the session behavior because the mobile device 12 will require some period of time to transit to cell B during the pendency of the session. As can be seen in table 2A, bandwidth usage on historic basis can change dramatically at various times of the day, for example, the beginning of rush hour. This same technique can be continued for other contiguous cells which lie further away from the initial cell. For example, historic bandwidth data for cell I might be used in a calculation using the data associated with 5:10p.m. or a later time. In this manner, the current bandwidth allocation for a cell together with the predicted bandwidth usage for the time when the session would be requested from that cell can be combined in a weighted fashion to provide a more accurate prediction of the available bandwidth at some time in the future.

Figure 4B:
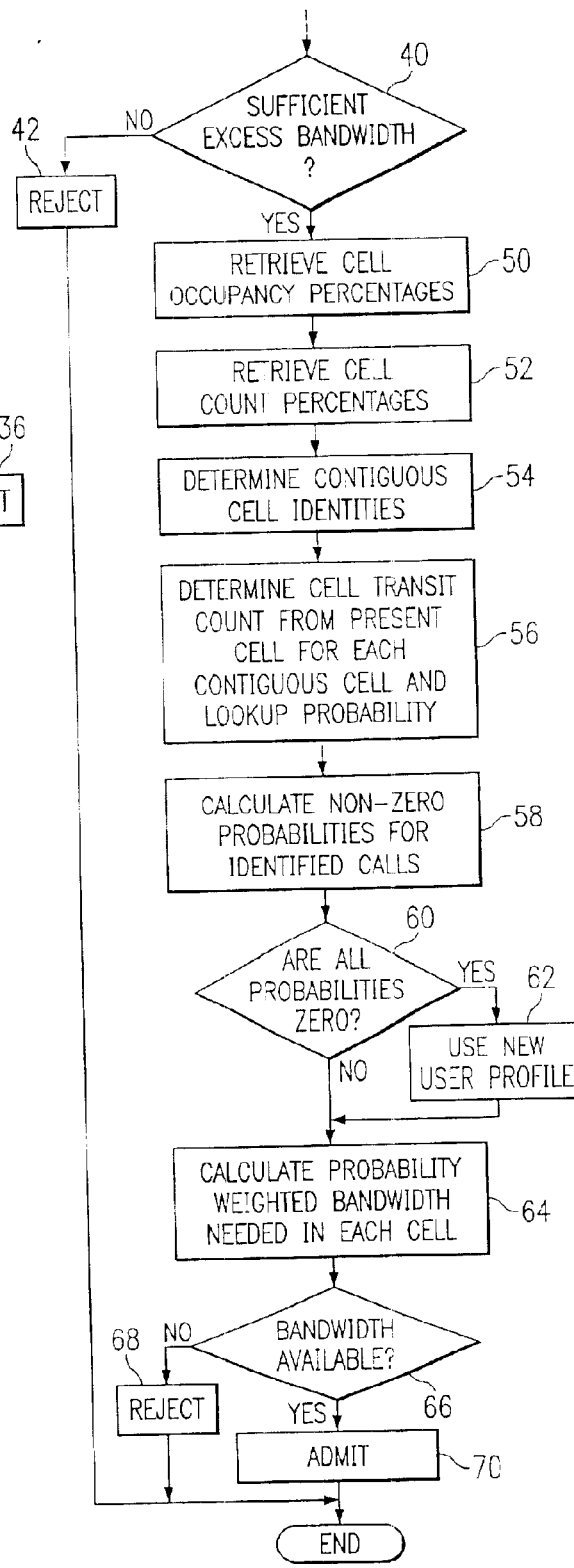

FIG. 4B illustrates an alternate method of determining which cells to test and how to test those cells to make the admission control determination. According to the embodiment shown in FIG. 4B, the same determinations are made as discussed with reference to steps 30–42 discussed with reference to FIG. 4A. That is, the initial cell must have the capacity to serve a new session within a particular class of service and must have the total capacity to serve the new session or the session is rejected. If both of those conditions are true, the method shown in FIG. 4B proceeds from common step 40 to new step 50 where the cell count percentages associated with the particular user are retrieved from storage associated with resource manager 20. This information may be in the form discussed with reference to FIG. 2C previously. This information is essentially a list of the cells which are most often occupied by the particular mobile device and the percentage of the time that the mobile device is resident within each cell. Referring to FIG. 2C, the mobile device in question which is associated with MSID 011 is resident in cell D 15% of the time, in cell F 3% of the time. This information is retrieved for the particular mobile unit in step 50.

The method then proceeds to step 52 where the second line of information in the table associated with FIG. 2B is retrieved. This information is historic usage information but also reflects the probability that a particular session will cross a number of cell boundaries. The method then proceeds to step 54 where the identifications for all the contiguous cells which may be needed are determined surrounding the initial cell. The method then proceeds to step 56 where a transit count number for each of the contiguous cells identified is determined by determining the number of cells crossed if the mobile user was to travel from the initial cell to the cell being examined on a straight line. For example, referring to FIG. 3, the transit count for cell Y would be 4 because a line between initial cell A and cell Y impacts four cells, cell A, cell C, cell K, and cell Y. The transit probability therefore, for cell Y is the percentage associated with a four cell call which referring to FIG. 2B is 5%. The method then proceeds to step 58 where all non-zero probabilities are calculated by multiplying the transit probability associated with the cell by the occupancy probability associated with the cell. For example, if the initial cell is cell A in FIG. 3, the total probability for cell I would be calculated by multiplying 2%×45% resulting in a total percentage of 0.9% or probability of 0.009. This is because the occupancy percentage of cell I is 2% reflecting the fact that the user resides in cell I 2%. of the time and the transit probability associated with cell I is 45% because a session that begins in cell A and ends up in cell I would be a three cell call. This calculation need only be performed for cells that do not have a zero occupancy probability. Therefore, the historic pattern of usage for the particular user will serve to limit the number of calculations that need to be performed.

The method then proceeds to step 60 where a determination is made as to whether or not there are any non-zero probabilities remaining after the calculations are performed in step 58. For example, if the user is in a foreign state in which he has never used his mobile device before, all of the contiguous cells and the cell in which he currently resides will have zero occupancy percentages. If this is true, the method proceeds to step 62 where a predetermined probability profile for a new user can be imposed, centered upon the initial cell. For example, an occupancy profile using 50% for the initial cell and 10% for each cell that is contiguous to the initial cell can be used whenever the occupancy probabilities are zero. Following the imposition of the new user profile in step 62 or following the negative determination in step 60, the method proceeds to step 64 where the probability weighted bandwidth for each of the cells is calculated. This is accomplished by multiplying the needed bandwidth for the requested session by the combined probability calculated in step 58. The resulting bandwidth number may ordinarily be a small fraction of the needed session bandwidth. The method then proceeds to step 66 where the probability adjusted bandwidth is compared to the available bandwidth in each of the cells. Once again, the available bandwidth may be adjusted by using the time of day data for future time segments within the historic usage table. If the probability adjusted band width is not available in each of the cells tested, the method proceeds to step 68 where the session is rejected. If the probability adjusted bandwidth is available in each of the cells tested, the method proceeds to step 70 where the session is admitted. The method then terminates.

Accordingly, in the aggregate, the probabilities of all users will add together resulting in a much fuller utilization of the available bandwidth across the system 10. The user transiting between the cells will actually use much more bandwidth than the probability adjusted bandwidth number in the cells to which he actually travels. However, he will not use the probability adjusted bandwidth from the cells where he does not travel. Accordingly, in the aggregate, the bandwidth allocation will create a more fully and evenly utilized network.

It should be understood that the admission control techniques of the present invention need not discriminate between users who are originating a session within a cell and users who are continuing sessions which were originated in other cells. As such, reserving bandwidth for indigenous users is not necessary. Further, the bandwidth needs of a session are determined at the time that the session is admitted to the network with a high probability of accuracy. In this manner, it is less likely that a session will be admitted at one point and will be dropped at another because a new cell entered by the user lacks the necessary bandwidth to support the session. In addition, the admission control techniques of the present invention allow for various classes of service and quality of service levels. The reserved bandwidth for best effort services and integrated services are efficiently and accurately incorporated in the currently available bandwidth calculations. In addition, maximum service levels for various types of differentiated services and integrated services can be incorporated as a check prior to the admission of a new session. In this manner, a single service class cannot dominate the available bandwidth associated with a cell.

Although the present invention has been described in detail it should be understood that various changes alternation substitutions and modifications may be made to the teachings described herein without departing from the spirit scope of the present invention which is solely defined by the appended claims.

What is claimed is:

1. A method of processing a request for a data communications session in a data network, comprising:
    storing in a data base for a plurality of potential users of the network a data set representing the historic usage pattern of each of the plurality of users with respect to the percentage of calls which affect a plurality of numbers of cells;
    determining whether there is sufficient bandwidth to accommodate the session in an initial cell associated with the request;
    determining a set of cells contiguous or near to the initial cell to which the session may be transferred during the pendency of the session;
    determining whether the selected set of cells have sufficient bandwidth to support a decision to admit the session; and
    admitting the session to the initial cell if there is sufficient bandwidth in the initial cell and the identified contiguous cells.

2. The method of claim 1 wherein the step of determining whether or not there is sufficient bandwidth in the initial cell comprises the step of adding a fraction of the current bandwidth usage of the cell with a fraction of the historic bandwidth usage of the cell.

3. The method of claim 1 wherein the step of identifying contiguous cells comprises a step of identifying contiguous cells to which the session may travel by identifying cells previously occupied by the user.

4. The method of claim 3 wherein the step of identifying cells previously occupied by the user comprises the step of identifying the percentage of time in which the user resides in a particular cell.

5. The method of claim 1 wherein the step of determining a set of cells comprises the step of calculating a percentage likelihood that a user requesting the session will affect each of a predetermined number of cells and comparing such percentages to a random number and selecting the set of cells responsive to the comparison.

6. The method of claim 1 wherein the step of determining whether the selected set of cells have sufficient bandwidth comprises the step of calculating a probability that a user requesting the session will enter a given cell and multiplying the probability by the requested bandwidth to yield a probabilistic weighted bandwidth and comparing the probabilistic weighted bandwidth to the actual available bandwidth in the given cell.

7. The method of claim 1 and further comprising:
    determining if the user requesting the service has ever resided in the initial cell or the contiguous or near cells; and
    if the user has not resided in the initial cell or the contiguous cells, assigning a new user probability profile to the user prior to calculating the available bandwidth.

8. The method of claim 1 wherein the step of determining whether the selected set of cells have sufficient bandwidth comprises the step of determining the available bandwidth at a contiguous or near cell by combining a fraction of the actual bandwidth available for that cell with a fraction of the historic bandwidth usage at that cell at a predetermined period of time in the future.

9. The method of claim 1 wherein the step of determining a set of cells comprises the step of generating a random probability fraction and adding the transit cell probabilities associated with a particular user until the random probability is exceeded and including all the cells identified within the identified number of transits from the initial cell within the set of cells identified.

10. A data communications system comprising:
    a plurality of base transceiver stations each station associated with a cell;
    a resource manager in communication with each of the base transceiver stations and operable to:
    store and use a table of data comprising historic usage information for a plurality of users of the system; and
    perform an admission control decision upon request from the base transceiver stations, the admission control decision comprising the steps of:
        determining whether there is sufficient bandwidth to accommodate the session in the initial cell associated with the request;
        determining a set of contiguous set of cells contiguous to the initial cell to which the session may be transferred during the pendency of the session;
        determining whether the contiguous cells have sufficient bandwidth to service the session; and
        admitting the session to the initial cell if there is sufficient bandwidth in the initial cell and the identified contiguous cells.

11. The system of claim 10 wherein the historic usage information comprises information associated with the cells in the system most frequently occupied by the user.

12. The system of claim 10 wherein the historic usage information associated with the number of cells affected by calls made by each of the plurality of users.

13. The system of claim 10 wherein the resource manager is operable to store and use a table of data comprising historic bandwidth usages information for a plurality of cells in the system.

14. The system of claim 13 wherein the usage information comprises usage information associated with usage levels at different times of day.

15. The system of claim 13 wherein the usage information comprises usage information associated with usage levels at different day of the week.

* * * * *